(12) United States Patent
Mackay (10) Patent No.: US 10,457,188 B1
(45) Date of Patent: Oct. 29, 2019

(54) SHIPPING CONTAINER RECREATIONAL VEHICLE

(71) Applicant: Jamie Mackay, Wilson, WY (US)

(72) Inventor: Jamie Mackay, Wilson, WY (US)

(*) Notice: Subject to any disclaimer, the term of this patent is extended or adjusted under 35 U.S.C. 154(b) by 95 days.

(21) Appl. No.: 15/901,139

(22) Filed: Feb. 21, 2018

(51) Int. Cl.
*B60P 3/34* (2006.01)
*B60P 3/36* (2006.01)
*B60D 1/06* (2006.01)
*B62D 65/02* (2006.01)

(52) U.S. Cl.
CPC .............. *B60P 3/34* (2013.01); *B60D 1/065* (2013.01); *B60P 3/36* (2013.01); *B62D 65/02* (2013.01)

(58) Field of Classification Search
CPC ... B60P 3/34; B60P 3/36; B62D 65/02; B60D 1/065
USPC .......................................................... 296/165
See application file for complete search history.

(56) References Cited

U.S. PATENT DOCUMENTS

| | | | |
|---|---|---|---|
| 3,183,991 A | 5/1965 | Gamaunt | |
| 3,565,288 A | 2/1971 | Shute | |
| 3,717,215 A | 2/1973 | Nigg | |
| 3,718,346 A | 2/1973 | Self | |
| 3,722,948 A | 3/1973 | Walsh | |
| 4,542,933 A | 9/1985 | Bischoff | |
| 4,854,094 A * | 8/1989 | Clark | E04B 1/3483 52/79.1 |
| 5,033,567 A | 7/1991 | Washburn | |
| 5,288,124 A | 2/1994 | Ward | |
| 5,301,997 A | 4/1994 | Cudden | |
| 5,454,597 A * | 10/1995 | Thomas | B62D 53/06 280/789 |
| 5,950,373 A | 9/1999 | Von Hoff | |
| 6,749,252 B2 | 6/2004 | Cervenka | |
| 6,830,417 B2 | 12/2004 | Deets | |
| 7,794,812 B2 | 9/2010 | Sanford | |
| 8,333,401 B2 | 12/2012 | Lares | |
| 9,302,605 B1 | 4/2016 | Van Pelt | |
| 2003/0009954 A1 | 1/2003 | Bradley | |
| 2005/0193643 A1 | 9/2005 | Pettus | |
| 2007/0098534 A1 | 5/2007 | Bergman | |
| 2008/0053992 A1 | 3/2008 | DeBord | |
| 2009/0223144 A1 | 9/2009 | Leahy | |
| 2009/0260302 A1 | 10/2009 | Graf | |
| 2009/0267320 A1 | 10/2009 | Phillips | |
| 2010/0191615 A1 | 7/2010 | Thomas | |
| 2010/0314898 A1 | 12/2010 | Hawkinson | |
| 2010/0320727 A1 * | 12/2010 | Haut | B62D 21/20 280/414.5 |
| 2011/0041415 A1 * | 2/2011 | Esposito | E04B 1/34331 52/12 |
| 2011/0100860 A1 | 5/2011 | Brown | |
| 2011/0209418 A1 | 9/2011 | Drake | |
| 2011/0302756 A1 | 12/2011 | Schikevitz | |
| 2012/0077429 A1 | 3/2012 | Wernimont | |

(Continued)

*Primary Examiner* — Pinel E Romain
(74) *Attorney, Agent, or Firm* — Durham Jones & Pinegar; Sarah Matthews; Randall B. Bateman (57) ABSTRACT

A shipping container recreational vehicle is described herein, comprising a standard shipping container, a subfloor, and an optional extension or slide-out portion. The shipping container recreational vehicle is built according to industry standards for recreational vehicles, such as ANSI 119.2, NPFA 1192, and federal motor safety codes. A method of forming the shipping container is also disclosed.

19 Claims, 5 Drawing Sheets

(56) References Cited

U.S. PATENT DOCUMENTS

| | | |
|---|---|---|
| 2012/0261407 A1* | 10/2012 | Cross .................... E04B 1/3431 |
| | | 220/1.5 |
| 2013/0257080 A1 | 10/2013 | Chase |
| 2013/0305625 A1 | 11/2013 | Pike |
| 2013/0305627 A1 | 11/2013 | Pike |
| 2014/0231284 A1 | 8/2014 | Ansari |
| 2015/0308110 A1 | 10/2015 | Cantin |
| 2015/0315807 A1 | 11/2015 | Pike et al. |
| 2016/0046336 A1 | 2/2016 | Norman et al. |

* cited by examiner

SHIPPING CONTAINER RECREATIONAL VEHICLE

TECHNICAL FIELD

This disclosure relates generally to use of a shipping container as a structure for a recreational vehicle and, more specifically, to a shipping container used as a recreational vehicle with the technical features and code compliance of recreational vehicles. The features disclosed herein are numerous in nature and may be utilized in a number of different ways to provide the same or similar shipping container recreational vehicle results.

RELATED ART

Re-purposing shipping containers for various reasons is known, such as shipping containers which may be re-purposed as pools, tiny houses, etc. For example, US2003/0009954 to Bradley, which is incorporated herein by reference. However, re-purposed shipping containers as tiny houses do not have the technical code compliance for use as recreational vehicles. Recreational vehicles must comply with several codes, such as ANSI 119.2, ANSI 119.5, fire protection codes like NFPA 1192, RVIA Standards, National Electrical Code standards like Article 551 and Article 552, Department of Transportation requirements such as the Federal Motor Vehicle Safety Standards as specified in Code of Federal Regulations, Title 49 Part 571, etc.

The shipping container recreational vehicle disclosed herein takes into account the various codes for compliance for recreational vehicles, in particular ANSI 119.2, 119.5, and NFPA 1192, and may also provide unique expandable options to increase the square footage of the shipping container recreational vehicle. The present invention may also provide a stable subfloor in the "set up" mode or when the wall slides out making the unit larger.

SUMMARY

This disclosure, in at least one aspect, relates to a new design for a shipping container recreational vehicle. The shipping container recreational vehicle may be built to code, such as ANSI 119.2, ANSI 119.5, fire protection codes like NFPA 1192, RVIA Standards, National Electrical Code standards Article 551 and Article 552, and the Federal Motor Vehicle Safety Standards as specified in Code of Federal Regulations, Title 49 Part 571, all of which are incorporated herein by reference.

According to one aspect, the shipping container recreational vehicle may comprise a standard shipping container, such as a 6.096 meter shipping container and/or a 12.192 meter shipping container, or any other size shipping container. Compliance with applicable codes may allow the shipping container recreational vehicle to bear a label, an insignia, and/or an insignia of approval of compliance with ANSI Standard No. A119.2 or A119.5 depending upon whether it is a recreational vehicle or park trailer. Such a label, an insignia, and/or an insignia of approval of compliance may allow the shipping container recreational vehicle to park in, for example, RV parks and the like.

According to another aspect, the shipping container recreational vehicle may be provided with a slide-out or extension portion. One of the sidewalls of the shipping container may be hinged at the bottom such that the sidewall may open outwardly. This hinged sidewall may be supported by one or more wires connected to the outer edge of the sidewall and proximal to the top of the shipping container. The sidewall may also be supported by one or more jacks which may be removably or permanently attached to the outer edge of the hinged sidewall.

In some configurations, a subfloor may be provided. The subfloor may form a chassis for supporting the shipping container recreational vehicle. The subfloor may be comprised of two main support rails, formed from I-beams, and two or more header rails, also formed from I-beams.

In some configurations it may be desirable to provide portions or areas of the subfloor to support various aspects of the shipping container recreational vehicle. For example, transverse beams extending between the main rails may support a living area portion of the shipping container recreational vehicle. Additional transverse beams, each with a pair of supporting cross beams, may support a kitchen-bath area portion of the shipping container recreational vehicle.

According to yet another aspect, a method is disclosed for forming a shipping container recreational vehicle. For example, a chassis may be fabricated. A shipping container may be built which complies with ANSI 119.2 and NFPA 1192. Next, the shipping container may be permanently affixed to the chassis, such that it meets the Federal Motor Vehicle Safety Standards as specified in Code of Federal Regulations, Title 49 Part 571. The shipping container may always remain permanently affixed to the chassis, and may not be removable from any portion of the chassis.

There is a plurality of means and methods for forming the shipping container recreational vehicle and multiple variations are disclosed herein. Other aspects, as well as features and advantages of various aspects of the disclosed subject matter will become apparent to one of ordinary skill in the art from the ensuing description, the accompanying drawings and the appended claims.

BRIEF DESCRIPTION OF DRAWINGS

The detailed description is described with reference to the accompanying figures. The components in the drawings are not necessarily to scale relative to each other Like reference numerals designate corresponding parts throughout the several views.

It will be appreciated that the drawings are illustrative and not limiting of the scope of the invention which is defined by the appended claims. The various elements of the invention accomplish various aspects and objects of the invention. It is appreciated that not every element of the invention can be clearly displayed in a single drawing, and as such not every drawing shows each element of the invention.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein. Likewise, it is not required that any feature in one embodiment be included in the invention as described by the claims unless that feature is expressly mentioned in the claims.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

As used in this specification and the appended claims, singular forms such as "a," "an," and "the" may include the plural unless the context clearly dictates otherwise. Thus, for example, reference to "a slide-out" may include an embodiment having one or more of such slide-outs, and reference to "the door" may include reference to one or more of such doors.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially hollow" would either be completely hollow or so nearly completely hollow that the effect would be effectively the same as if it were completely hollow.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Figure 1:
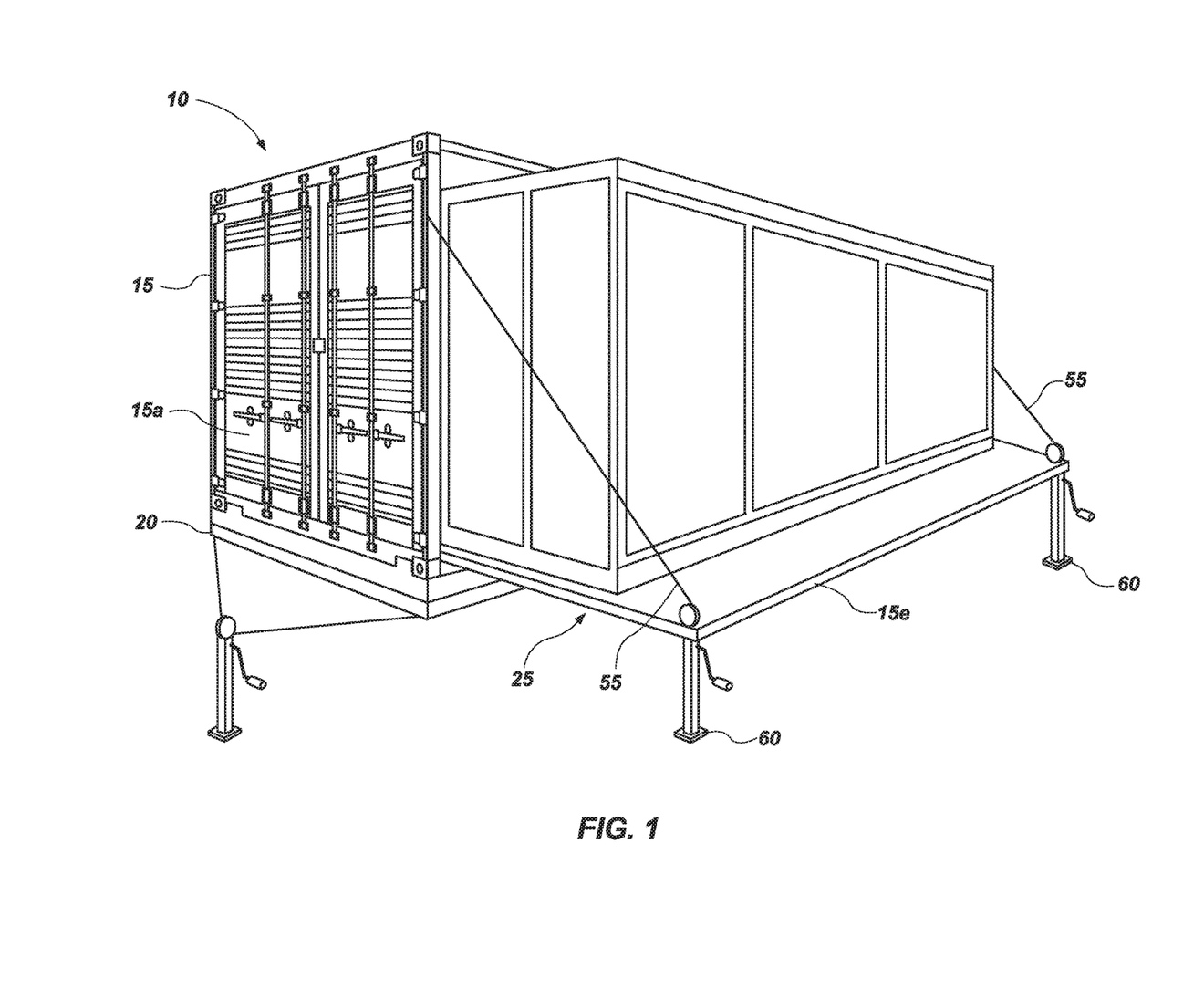
FIG. 1 is a perspective view of a shipping container recreational vehicle, with the slide-out in an extended position.
Figure 2:
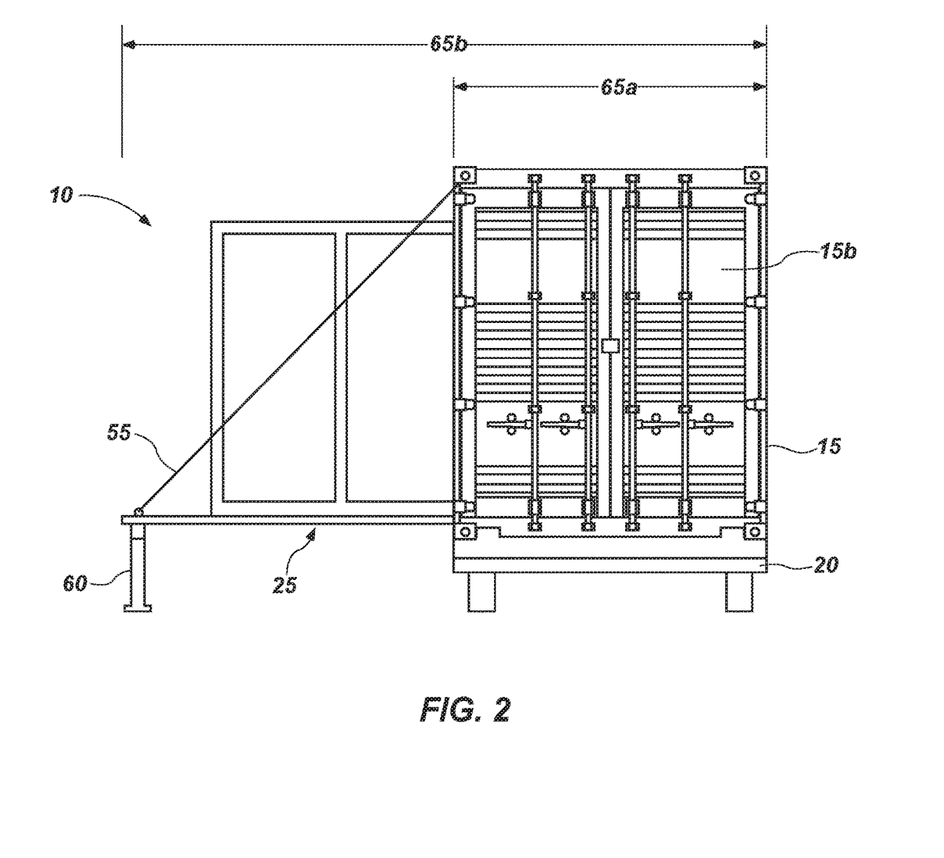
FIG. 2 is a rear view of the shipping container recreational vehicle of FIG. 1.
Figure 3:
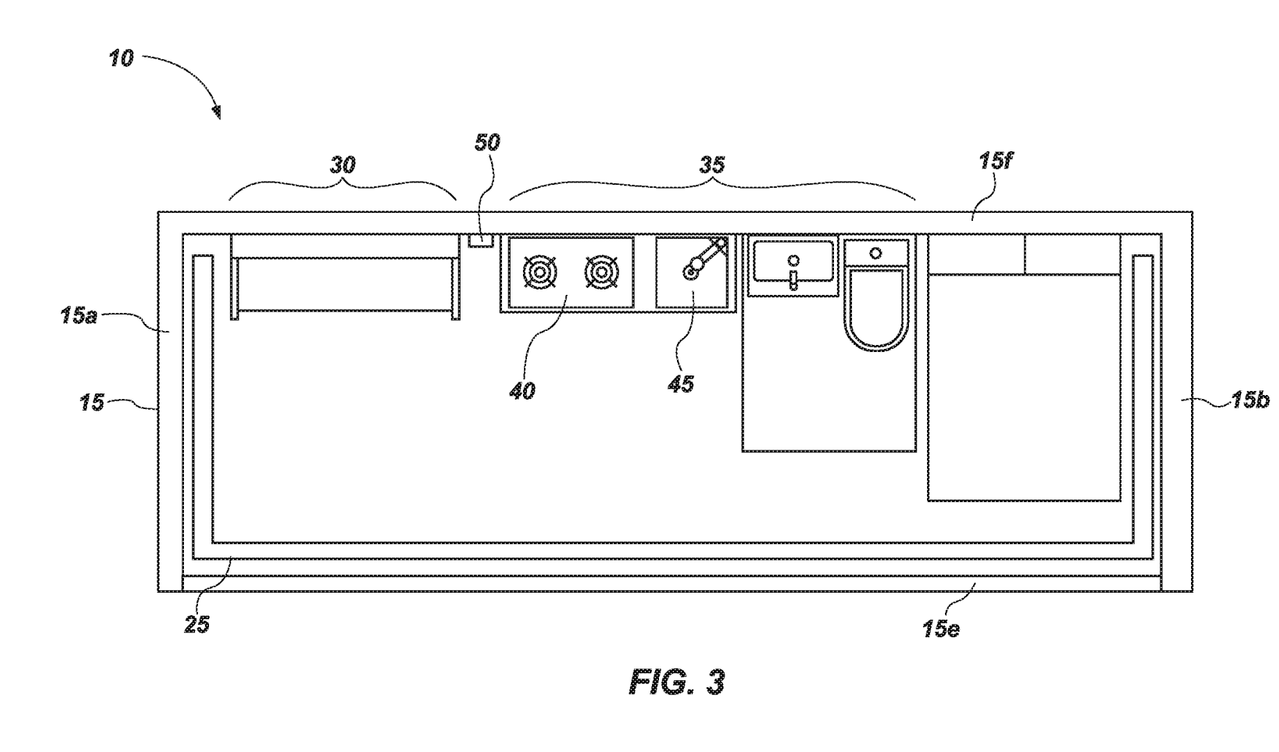
FIG. 3 is a top plan view of an exemplary shipping container recreational vehicle, with the top removed, and the slide-out in a retracted position.

Turning now to FIGS. 1-3, there is shown a several views of a shipping container recreational vehicle, generally indicated at 10. The shipping container recreational vehicle may generally be comprised of a shipping container 15, a chassis or subfloor 20, and an extension or slide-out 25. The shipping container 15 may be any suitable shipping container. For example, shipping containers of standard sizes, such as those with a length of about 12.2 meters (40 feet) and a height of about 2.6 meters (8 feet, 6 inches) may be used. The shipping containers may be made of any suitable material, such as those made of corrugated weathering steel.

The shipping container 15 may form an interior of the shipping container recreational vehicle. The interior may be provided with various features common in a recreational vehicle, such as a living area (designated as 30 in FIG. 3), and/or a kitchen-bath area (designated as 35 in FIG. 3). The interior and other structures of the shipping container recreational vehicle may be built to meet or exceed all relevant codes. For example, Recreational Vehicle Industry Association and the American National Standards Institute 119.2 and 119.5, National Fire Protection Association 1192, etc., are codes which govern recreational vehicles, all of which are incorporated herein by reference in their entireties. The shipping container recreational vehicle 10 may also comply with RVIA Standards, National Electrical Code standards like Article 551 and Article 552, Department of Transportation requirements such as the Federal Motor Vehicle Safety Standards as specified in Code of Federal Regulations, Title 49 Part 571, etc.

By way of example, the living area 30 may include a sitting area such as a couch and/or table. The kitchen-bath 35 area may include a stove 40 coupled to the shipping container, and one or more plumbing fixtures 45 such as a toilet and/or sinks. Both the living area 30 and the kitchen-bath area 35 may include electrical receptacles 50. Depending on the location of the electrical receptacles 50, the electrical receptacles 50 may comprise ground fault protected electrical receptacles in accordance with code.

Similarly, in order to be built to code, a propane or gas line may be provided to the stove, and a compartment may be formed in the shipping container for storage of a propane tank. The compartment for storing a propane tank may be vaportight to the interior of the shipping container recreational vehicle to comply with RVIA-ANSI code. Preferably, the propane line is formed from one of steel, wrought iron, copper, or brass as required by code. In some configurations, a propane tank may be coupled to the propane line, and the propane tank may comprise an overfill protection device.

Each of the plumbing fixtures 45 coupled to the shipping container recreational vehicle may be provided with a backflow contamination prevention, a trap, and a vent.

The shipping container recreational vehicle may also be provided with an extension portion or slide-out 25. In order to support the extension, one of the sidewalls of the shipping container may be hinged, such that it may open outwardly. For example, the shipping container 15 has a front wall 15a, a backwall 15b (which may include one or more doors), a top wall 15c, a bottom wall 15d, a first sidewall 15e and a second sidewall 15f (15a and 15e are visible in FIG. 1). A support wire 55, connected from the top of the sidewall to a location proximal to the top of the shipping container, may be provided. In some configurations, a support wire 55 may be provided on each end of the sidewall 15e. One or more jacks 60 also be used to support the weight of the slide-out or extension. The jacks 60 may be permanently affixed to the corners of the sidewall 15e, or the jacks may be stored under the recreational vehicle and attached when the slide-out or extension portion 25 is extended.

The extension portion 25 may have a first position where it is not extended, and a second position where it is extended. FIG. 3 shows the slide-out 25 is the first position. This first position may be used, for example, when moving or transporting the shipping container recreational vehicle 10. In this position, the extension portion 25 may be located entirely within the shipping container, and the sidewall 15e may be in place against the shipping container. The extension portion 25 may also have a second position wherein it is extended. This may be useful when the shipping container recreational vehicle has reached its destination and it is desirable to increase the square footage of the shipping container recreational vehicle. The hinged sidewall 15e may be released such that it opens downwardly (being supported by the support wire 55 and/or one or more jacks 60). The extension or slide-out 25 may then be moved outwardly, being supported by the hinged sidewall. The shipping container recreational vehicle may have a first width (indicated at arrows 65a in FIG. 2) of about 2.4 meters. Various configurations may be used, and various sizes of shipping containers may be used, such that the first width may vary. According to Department of Transportation requirements the first width may be 8 feet, 6 inches or less, and the height of the shipping container recreational vehicle 10 may be 13 feet, 6 inches or less.

The first width, by way of example, may be 2.4 meters when the extension portion 25 is in the first non-extended position, and a second width (indicated at arrows 65b in FIG. 2) of about 5 meters when the extension portion is in the second extended position. This second width corresponds to the first width (about 2.4 meters) plus the height of the sidewall 15e (about 2.6 meters) when the sidewall 15e is hinged outwardly as shown in FIG. 2. Again, it will be appreciated that the first and second width may vary widely depending on the size of the shipping container used, and the desired size of the extension portion.

As noted above, the shipping container recreational vehicle may be permanently affixed to a chassis. The chassis may form a subfloor 20, or may act as a subfloor. This may have the advantage or allowing the shipping container recreational vehicle to be driven onto a foundation and act as a home without a need for any additional subfloor.

Figure 4:
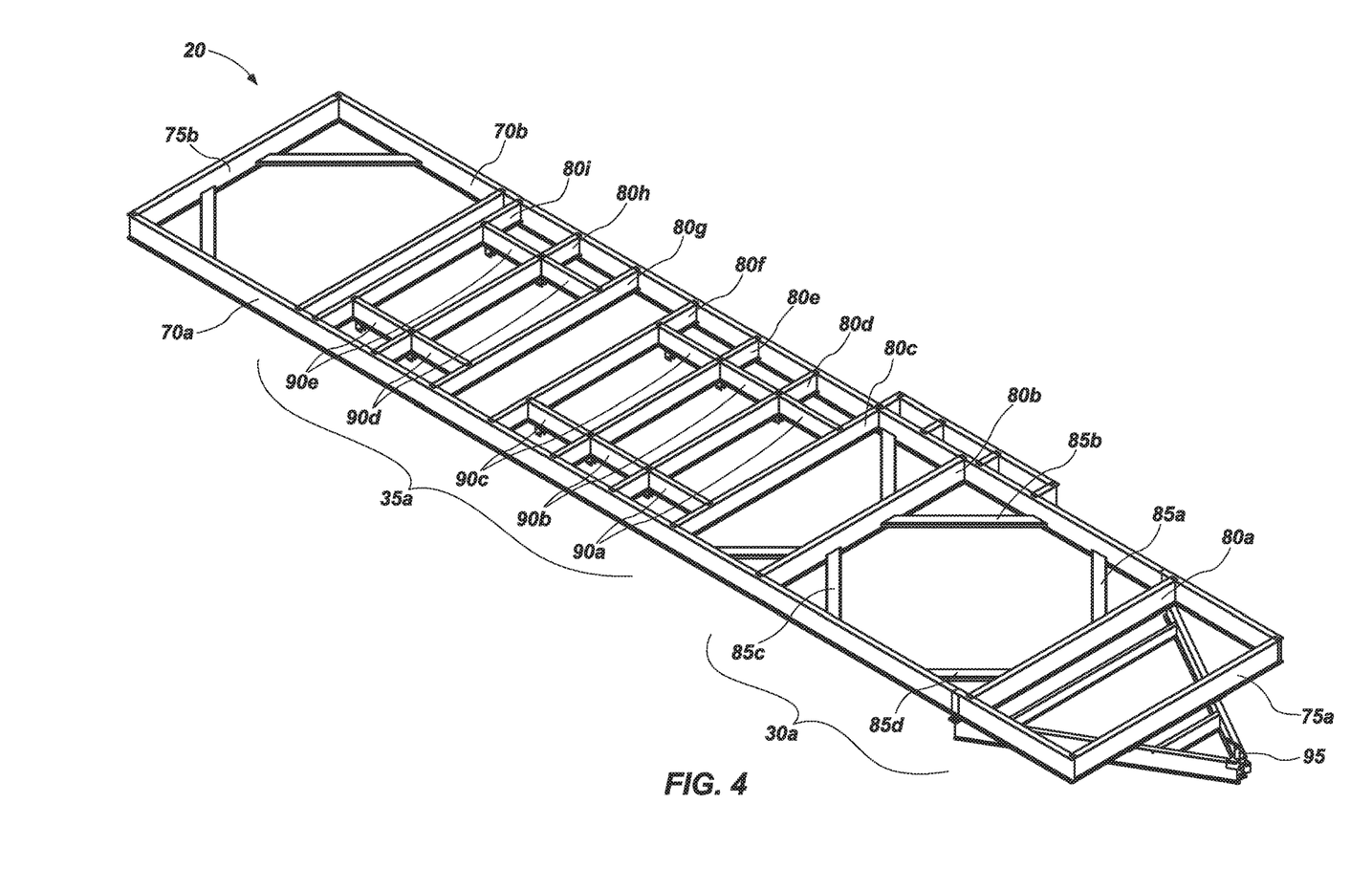
FIG. 4 is a perspective view of an exemplary subfloor.

The subfloor 20 may comprise a plurality of steel I-beams. FIG. 4 shows a perspective view of a chassis subfloor, generally indicated at 20. The chassis may be formed by a first main rail 70a and a second main rail 70b. For configurations based on a 6.096 meter shipping container, these main rails may be about 6.096 meters long, or in some configurations may be slightly longer. For configurations based on a 12.192 meter shipping container, the main rails may be about 12.192 meters long. The main rails may comprise steel I-beams, and are welded at each end to a header rail, such as a first header rail 75a and a second header rail 75b. The main rails and header rails thus form a rectangular support structure. The header rails may similarly comprise steel I-beams welded to the main rails. A plurality of transverse I-beams, welded between the main rails, may also be provided to further brace and support the structure.

The subfloor may comprise a living area support portion (indicated at 30a) and a kitchen-bath support portion (indicated at 35a). The living area support portion 30a may generally be below the living area 30 (see FIG. 3) and the kitchen-bath support portion 35a may be generally below the kitchen-bath area 35 (FIG. 3).

According to one configuration, the subfloor 20 may comprise a living area support portion 30 which includes the main rails 70a and 70b, and a first transverse I-beam 80a welded at a first end to the first main rail 70a and at a second end to the second main rail 70b. A second transverse I-beam 80b may also be provided, and welded at a first end to the first main 70a rail and at a second end to the second main rail 70b. Each of the transverse I-beams may be about 3 meters long, and spaced about three meters apart from each other such that the first transverse I-beam 80a and second transverse I-beam 80b form a square having four corners with the first main rail 70a and second main rail 70b. In some configurations, four diagonal braces 85a-d may be welded proximal to each of the four corners to further support the living area support portion 30a. The diagonal braces 85a-d may form an angle of about forty-five degrees relative to each corner.

In some configurations, the kitchen-bath support portion 35a may include additional transverse support beams compared to the living area support portion 30a. By way of example, the kitchen-bath support portion may comprise seven transverse I-beams, 80c-i. Each of the seven transverse I-beams may have a length of about 3 meters. (It will be appreciated that the transverse I-beams may be formed from a single I-beam having a length of 3 meters, or one or more I-beams welded end-to-end to form an I-beam having a length of about 3 meters.) The seven transverse I-beams may be welded at each of their ends to the main rails such that the transverse I-beams extend from the first main rail 70a to the second main rail 70b.

The transverse I-beams may be spaced apart from each other from about 0.86 meters apart to about 0.91 meters apart. The transverse I-beams may be further supported by a pair of support I-beams 90a-e which run parallel to the main beams. Each of the support I-beams in the pair of support I-beams 90a-e may have lengths that span the distance apart between the transverse I-beams 80c-i, e.g., lengths of about 0.86 meters to about 0.91 meters. Each of the support I-beams may be welded at each of their ends to a transverse I-beam such that the support I-beams extend from one transverse I-beam to another. The support I-beams may be located any suitable distance from the main rails 70a and 70b. For example, in the configuration shown in FIG. 4, the support I-beams run parallel to the main rails, and each of the support I-beams in the pair of support I-beams 90a-e and are located about 0.6 meters from the main rail. This attachment of the pairs of support I-beams 90a-e to the transverse beams 80c-i forms a plurality of rectangles within the kitchen-bath support portion 35a. It will be appreciated that the subfloor may have various other configurations which are contemplated herein.

The shipping container recreational vehicle described herein may be provided with a ball hitch 95 such that it may form a towable trailer. In other configurations, the chassis 20 may be permanently affixed to a motorized vehicle to form a standalone shipping container recreational vehicle.

Figure 5:
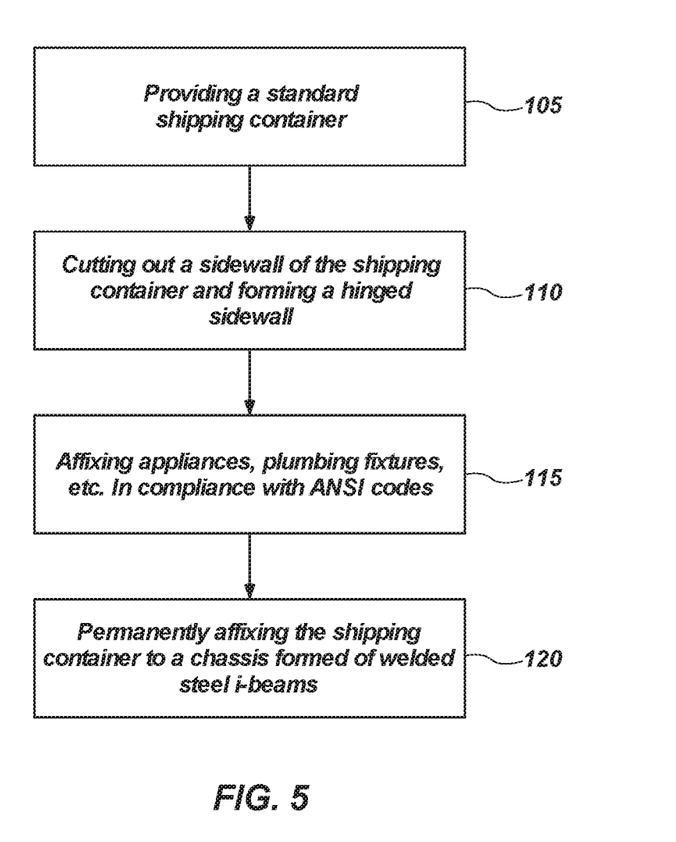
FIG. 5 shows a diagram of steps which may be taken in forming a shipping container recreational vehicle as described herein.

The present disclosure also relates to a method of forming a shipping container recreational vehicle, as described in FIG. 5, comprising the following steps: providing a shipping container formed from corrugated weathering steel (105), the shipping container having a front wall, a back wall, a top wall, a bottom wall, and two side walls; cutting out a sidewall and forming a hinge on at least one of the two sidewalls such that the at least one of the two sidewalls may open outwardly (110); affixing appliances to the shipping container (115); attaching a slide-out to the shipping container; and permanently affixing the shipping container to a chassis (120), the chassis forming a subfloor comprised of a plurality of I-beams welded together. The method may also include coupling at least one stove to the shipping container, coupling at least one plumbing fixture to the shipping container, the at least one plumbing fixture having backflow contamination prevention, a trap, and a vent; and coupling at least one ground fault protected electrical receptacle to the shipping container. The shipping container may be permanently affixed to the chassis such that no portion of the shipping container may be removed from the chassis, but will remain affixed to the chassis at all times (whether during transportation down a road or parked in use for shelter).

While the present disclosure shows various specific embodiments of the shipping container recreational vehicle, it will be appreciated in light of the present disclosure that other configurations may be used in accordance with principle of the present invention. Thus it should be appreciated that the appended claims are not limited by the specific embodiments discussed herein.

Thus there is disclosed an improved shipping container recreational vehicle. Those of skill in the art will appreciate that numerous modifications may be made hereto without departing from the scope and spirit of the invention. The appended claims are intended to cover such modifications.

What is claimed is:

1. A shipping container recreational vehicle comprising:
   a shipping container made of corrugated weathering steel, and forming an interior of the shipping container recreational vehicle;
   an extension portion, the extension portion having a first non-extended position and a second extended position, and wherein the shipping container recreational vehicle has a first width of about 2.4 meters when the extension portion is in the first non-extended position, and a second width of about 5 meters when the extension portion is in the second extended position;
   at least one stove coupled to the shipping container, the stove coupled to a propane line, and a compartment for storage of a propane tank, the compartment being vaportight to the interior of the shipping container recreational vehicle;
   at least one plumbing fixture coupled to the shipping container, the at least one plumbing fixture having backflow contamination prevention, a trap, and a vent;
   at least one electrical receptacle coupled to the shipping container, the at least one electrical receptacle electrical receptacle comprising a ground fault protected electrical receptacle; and
   a subfloor permanently affixed to the shipping container, the subfloor comprising a chassis with a plurality of steel I-beams welded to the chassis.

2. The shipping container recreational vehicle of claim 1, wherein the subfloor further comprises a rectangular structure formed from I-beams, and a plurality of transverse I-beams bracing the rectangular structure.

3. The shipping container recreational vehicle of claim 2, wherein the subfloor further comprises I-beams braced diagonally across the rectangular structure.

4. The shipping container recreational vehicle of claim 3, wherein the subfloor forms a rigid flat bottomed base for supporting the shipping container.

5. The shipping container recreational vehicle of claim 2, wherein the subfloor comprises a living area support portion and a kitchen-bath support portion.

6. The shipping container recreational vehicle of claim 5, wherein the living area support portion comprises two transverse I-beams welded to the chassis, each of the two transverse I-beams being about three meters long and spaced about three meters apart, forming a square with four corners, and at least four diagonal braces welded proximate to each of the four corners.

7. The shipping container recreational vehicle of claim 6, wherein each of the four diagonal braces forms an angle of about forty-five degrees relative to each of the four corners.

8. The shipping container recreational vehicle of claim 6, wherein the kitchen-bath support portion comprises at least seven transverse I-beams, each of the seven transverse I-beams having a length of about 3 meters and spaced between about 0.86 meters and about 0.91 meters apart, and further comprising at least ten support I-beams, each of the at least ten support I-beams having a length of about 0.86 meters to about 0.91 meters and a first end and a second end, wherein the first end of the at least ten support I-beams is attached to a transverse I-beam and the second end of the at least ten support I-beams is attached to a transverse I-beam, forming a plurality of rectangles within the kitchen-bath support portion.

9. The shipping container recreational vehicle of claim 1, wherein the chassis further comprises a ball hitch to form a towable trailer.

10. The shipping container recreational vehicle of claim 1, wherein the chassis is permanently connected to a motorized vehicle to form a standalone shipping container recreational vehicle.

11. The shipping container recreational vehicle of claim 1, further comprising a propane tank coupled to the propane line, the propane tank comprising an overfill protection device.

12. The shipping container recreational vehicle of claim 1, the shipping container having a length of about 12.2 meters and a height of about 2.6 meters.

13. A shipping container recreational vehicle comprising:
   a shipping container made of corrugated weathering steel,
   a chassis for supporting the shipping container, the chassis being permanently affixed to the shipping container; and
   wherein the shipping container recreational vehicle complies with ANSI 119.2 and NPFA 1192.

14. The shipping container recreational vehicle of claim 13, further comprising a slide-out, the slide-out having a first non-extended position and a second extended position.

15. The shipping container recreational vehicle of claim 14, wherein the shipping container recreational vehicle has a first width of about 2.4 meters when the slide-out is in the first non-extended position, and a second width of about 5 meters when the slide-out is in the second extended position.

16. The shipping container recreational vehicle of claim 14, wherein the chassis comprises a first main rail and a second main rail, the first main rail and second main rail connected to each other via a first header rail and a second header rail, the first main rail, second main rail, first header rail, and second header rail forming a rectangle.

17. The shipping container recreational vehicle of claim 14, wherein the shipping container is not removable from the chassis.

18. A method of forming a shipping container recreational vehicle, the method comprising:
   providing a shipping container formed from corrugated weathering steel, the shipping container having a front wall, a back wall, a top wall, a bottom wall, and two side walls;
   cutting out at least one of the two sidewalls and forming a hinge such that the at least one of the two sidewalls may open outwardly and forms a hinged sidewall;
   attaching a slide-out to the shipping container;
   coupling at least one stove to the shipping container;
   coupling at least one plumbing fixture to the shipping container, the at least one plumbing fixture having backflow contamination prevention, a trap, and a vent; and
   coupling at least one ground fault protected electrical receptacle to the shipping container; and
   permanently affixing the shipping container to a chassis, the chassis forming a subfloor comprised of a plurality of I-beams welded together.

19. The method of claim 18, wherein the step of permanently affixing the shipping container to the chassis comprises affixing the shipping container such that the shipping container cannot be subsequently removed from the chassis.

\* \* \* \* \*